Aug. 12, 1924.
J. R. BAUDE
1,504,416
EMERGENCY CHAIN FOR NONSKID TIRE CHAINS
Filed Feb. 12, 1923
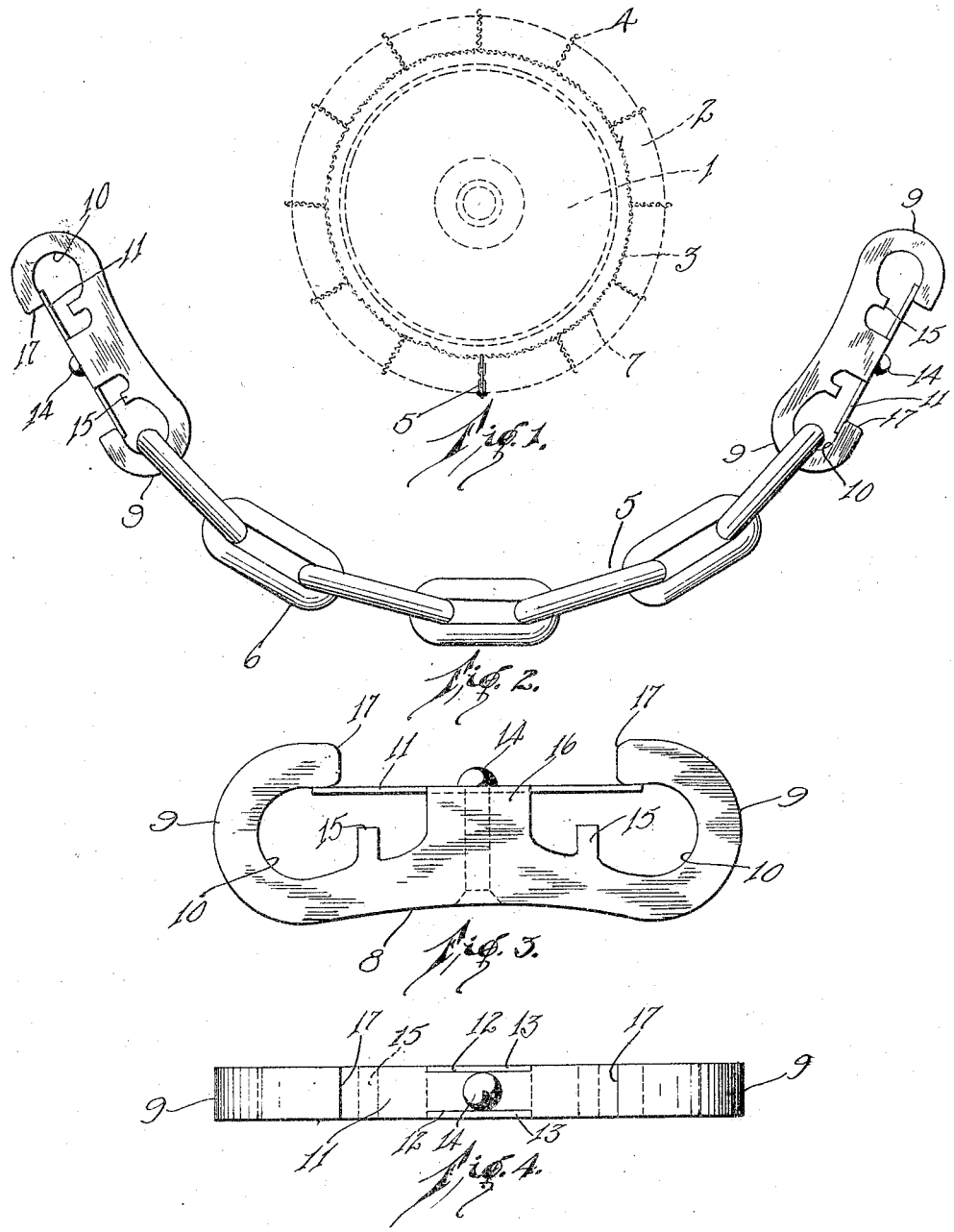
INVENTOR
J. R. Baude
BY Munn & Co
ATTORNEYS Patented Aug. 12, 1924.

1,504,416

UNITED STATES PATENT OFFICE.

JOSEPH R. BAUDE, OF CHICAGO, ILLINOIS.

EMERGENCY CHAIN FOR NONSKID TIRE CHAINS.

Application filed February 12, 1923. Serial No. 618,650.

*To all whom it may concern:*

Be it known that I, JOSEPH R. BAUDE, a citizen of the United States, and a resident of Chicago, in the county of Cook and State of Illinois, have invented a new and useful Improvement in Emergency Chains for Nonskid Tire Chains, of which the following is a full, clear, and exact description.

My invention relates to improvements in emergency chains for non-skid tire chains, and it consists in the combinations, construcions, and arrangements herein described and claimed.

An object of my invention is to provide an emergency chain which is adapted to take the place of one of the transverse chains that extends around the tread of the tire when the latter has become broken.

A further object of my invention is to provide a device of the character described which is adapted to be quickly and easily secured to the non-skid chain.

A further object of my invention is to provide a device of the character described which makes use of a novel hook for securing the emergency chain to the non-skid chain.

A further object of my invention is to provide a device of the character described which is simple in construction, durable and efficient for the purpose intended, and which may be packed in a relatively small space.

Other objects and advantages will appear in the following specification, and the novel features of the invention will be particularly pointed out in the appended claim.

My invention is illustrated in the accompanying drawings, forming part of this application, in which—

Figure 1 is a side elevation of a tire showing the emergency chain operatively applied to the non-skid chain of the tire.

Figure 2 is a plan view of the emergency chain,

Figure 3 is a side elevation of the hook which is employed with the chain, and

Figure 4 is a top plan view of Figure 3.

In carrying out my invention, I make use of a wheel 1 which has a tire 2 disposed thereon. A non-skid chain 3 is disposed around the tire 2 in the ordinary manner. The parts thus far described form no part of my invention except in so far as they cooperate with the parts about to be described.

It will be noted from Figure 1 that one of the transverse chains 4 of the non-skid chain 3 is missing and that the emergency chain, indicated generally at 5, takes the place of the missing chain. The chain 5 consists of a plurality of links 6. These links are of sufficient number so as to span the distance between the two circular chains 7 of the non-skid chain. Hooks 8 of the shape shown in Figures 3 and 4 are secured to the end links of the chain 5. The hooks are of novel shape and consist of two portions which are identical with respect to each other. The hook has a curved portion 9 at each end. Each curved portion provides a recess 10 which is adapted to receive the end links 6. The openings to the recesses 10 are closed by means of a leaf spring 11. In Figure 4 I have shown the leaf spring as being provided with two recesses 12 in its sides which are adapted to receive upwardly extending lugs 13 of the hooks. These lugs prevent longitudinal and lateral movement of the spring 11 with respect to the hook 8. The spring 11 is secured to the hook 8 by means of a rivet 14. The hook 8 also has projections 15 which extend into the recesses 10 and which prevent the full pressure of the links from being carried by the portions of the spring 11 which extend from the central portion 16 to the ends 17 of the curved portions 9. The portions 15 also have a further function. It will be noted that the portions 15 act as stops for the downward movement of the ends of the springs 11.

From the foregoing description of the various parts of the device, the operation thereof may be readily understood. Two of the hooks 8 are provided for each chain 5 and are secured to the chain in the manner shown in Figure 2. The driver may carry as many of these chains with him as is desired. When one of the transverse chains 4 breaks, the chain 4 is removed from the non-skid chain 3. The driver then takes the emergency chain 5 and secures it in place to the chain 3 in the place which was formerly taken by the transverse chain 4. The chain is readily snapped in place by means of the hooks 8. The free ends of the hooks 8 receive one of the links of the curved chain 7, whereby the emergency chain 5 is secured to the chain 3. The leaf spring 11 prevents the chain 5 from becoming disengaged from the chain 3. The chain 3 can now be used in the ordinary manner.

The device is extremely simple in construction and operation, and can be readily assembled to an ordinary non-skid chain.

I claim:

In a device of the type described, a hook comprising a body portion having two curved ends which provide link receiving recesses, said hook having a central portion, a leaf spring secured to said central portion and extending to the ends of said curved portions so as to normally close the recesses, and projections extending inwardly into said recesses, said projections aiding in carrying part of the force which may be exerted against said spring and also limiting the movement of said spring.

JOSEPH R. BAUDE.